May 7, 1968 TADAO OHFUJI 3,381,402

PHOTOGRAPH MOUNTS AND METHOD FOR PRODUCING THE SAME

Filed Aug. 25, 1965

United States Patent Office 3,381,402
Patented May 7, 1968

3,381,402
PHOTOGRAPH MOUNTS AND METHOD FOR
PRODUCING THE SAME
Tadao Ohfuji, 290 Okino-cho, Adachi-ku, Tokyo, Japan
Filed Aug. 25, 1965, Ser. No. 482,401
Claims priority, application Japan, Sept. 1, 1964,
39/49,508
1 Claim. (Cl. 40—158)

ABSTRACT OF THE DISCLOSURE

A mount for photographs comprises a pasteboard base having a non-drying tacky adhesive on its opposite faces, and a transparent synthetic resin film covering and releasably adhering to both faces of the base.

This invention relates to a photograph mount and a method for producing the same, characterized in that photographs may be mounted on said mount at desired positions and arrangement without applying any adhesive to the back sides of the photographs nor using any photograph fixing corners, and the surfaces of the photographs can be protected with a transparent film to be prevented from damage, loss and contamination.

As photograph mounts, there have conventionally been used pasteboards, and photographs have been preserved by applying a suitable adhesive to the back sides of the photographs and mounting the photographs on said pasteboards. It has, however, been markedly troublesome to mount photographs, depending on the quality of papers of photographs to be mounted and on the kind of adhesive employed. Further, the use of corners has also encountered various inconveniences such as the troublesomeness in the arrangement of positions and in the application of corners. Even when photographs have been mounted in the above manners, the surfaces thereof are directly exposed outside and hence tend to suffer necessarily from such drawbacks as contamination, damage, loss and fading.

As the result of studies with a view to obtain photograph mounts free from such drawbacks as mentioned above, the present inventor has been successful in producing a photograph mount by placing a transparent synthetic resin film on a pasteboard coated with a non-drying adhesive. The photograph mount thus prepared is entirely free from the aforesaid drawbacks and is usable with much convenience.

It is an object of the present invention to provide a photograph mount which comprises a pasteboard, a non-drying adhesive applied onto both sides of said pasteboard and a transparent synthetic resin film placed on said pasteboard so as to adhere onto both sides thereof, one end of said film being bonded to the pasteboard.

It is another object of the present invention to provide a method for producing a photograph mount which comprises applying a non-drying adhesive onto both sides of a pasteboard, placing a transparent synthetic resin film on one side of the pasteboard, folding the pasteboard at the center so that the other side thereof is overlapped and adhered, bonding the film and the pasteboard at both end portions and then cutting the film at bonded ends along the bonded portions.

Figure 1:
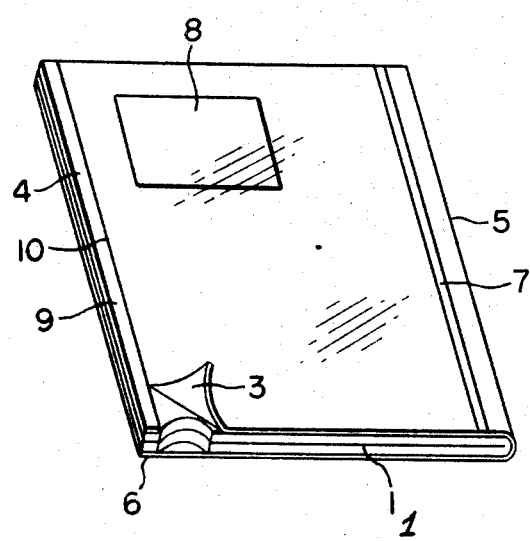
Figure 2:
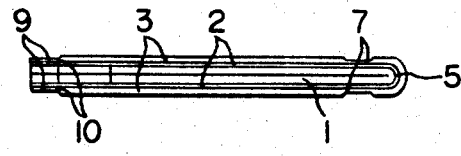

The structure of the photograph mount of the present invention is illustrated with reference to the accompanying drawings, wherein FIG. 1 is an oblique view of the photograph mount of the present invention, and FIG. 2 is a cross-sectional view of said mount.

In the drawing, 1 is a pasteboard for supporting photographs. Onto both sides of the pasteboard, a tacky or non-drying adhesive is applied to form an adhesive layer 2. The adhesive to be used in the present invention is composed mainly of a synthetic rubber, such as Bitternex, or natural rubber, and contain suitable amounts of rosin, sulfur, filler, etc. The adhesive is dissolved in toluene or benzene and is uniformly applied onto both sides of the pasteboard to form the adhesive layer. On the adhesive layer thus formed on both sides of the pasteboard, a sheet of transparent synthetic resin film 3 is placed from one end 4 of the front surface to the same end 6 of the back surface while covering the other end portion 5 of the pasteboard. The transparent synthetic resin film is flexibly elastic and adheres to the adhesive layer when a pressure is applied thereto, but is easily released from the pasteboard when one end of the film is peeled by hand. Along the end portion 5 which is covered with the transparent film, the pasteboard 1 is firmly bonded with a suitable width to the transparent film 3 to form a bonded portion 7, so that the film cannot be peeled by hand. Such secure bonding is easily effected by applying heat and pressure to the surface of the film, since the adhesive layer has been formed on the pasteboard.

Since the structure of the present photograph mount is as illustrated above, a photograph 8 may be mounted on the photograph mount by peeling one end 4 of the synthetic resin film, placing the back side of the photograph at suitable position on the surface of the adhesive layer 2, overlapping the film 3 again on the adhesive layer and then lightly pressing the transparent film. In this case, since the transparent film is free from adhesivity, the surface of the inserted photograph is not stained at all, and only the portions of the film which are not contacted with the photograph are adhered onto the adhesive layer or the pasteboard, whereby the photograph is fixed on the pasteboard and the surface of the photograph is prevented from dirt of the hands or stains. The present photograph mount is convenient in that, even when the whole transparent film is to be peeled in order to mount photographs on the whole surface of the pasteboard, the film is not released from the pasteboard any more along the bonded portion 7. Furthermore, in case a plurality of the present photograph mounts are filed together, it is possible to form an album, since each mount has the transparent film adhered on both sides.

The photograph mount of the present invention may be prepared in the following manner:

The aforesaid non-drying adhesive is applied onto both sides of a pasteboard which has been cut into a given width, and a transparent synthetic resin film is adhered onto one side of the pasteboard. The pasteboard is then cut to twice the length of the surface onto which photographs are to be mounted, folded at the center so that the other side of pasteboard is overlapped each other, and the folded pasteboard is pressed to form a composite. In the above manners, there is obtained a sheet of the present photograph mount having the transparent film adhered onto both sides. Both ends 7 and 9 of the photograph mount thus prepared are thermally treated so that the film at said portions is bonded with a suitable width to the the pasteboard, and the film at one end 9 of each side is cut along the bonded portion to form an opening 10.

According to the above method, the photograph mount of the present invention can be produced simply and

What is claimed is:

1. A photograph mount comprising a pasteboard base member, tacky, non-drying pressure-sensitive adhesive coatings on both faces of said face member, and a transparent film overlying both of said faces of the base member so as to be releasably adhered thereto by said adhesive coatings whereby photographs can be located and secured to each face of said base member under said transparent film.

References Cited

UNITED STATES PATENTS

| 2,283,026 | 5/1942 | Yates | 129—20 |
|---|---|---|---|
| 2,587,434 | 2/1952 | Bowden et al. | 40—158 |
| 2,963,809 | 12/1960 | Parker | 40—158 |
| 2,598,755 | 6/1952 | Birch | 40—158 |
| 2,876,572 | 3/1959 | Holes | 129—20 |

EUGENE R. CAPOZIO, *Primary Examiner.*

W. J. CONTRERAS, *Examiner.*

Notice of Adverse Decision In Interference

In Interference No. 97,031 involving Patent No. 3,381,402, T. Ohruji, PHOTOGRAPH MOUNTS AND METHOD FOR PRODUCING THE SAME, final judgment adverse to the patentee was rendered Jan. 4, 1972, as to claim 1.

[*Official Gazette May 30, 1972.*]